Oct. 10, 1967     E. A. LINKE     3,346,795
SPEED CONTROL SYSTEM FOR POLYPHASE INDUCTION MOTORS
Filed May 25, 1965     2 Sheets-Sheet 1

INVENTOR.
ERNEST A. LINKE

ATTORNEY

INVENTOR.
ERNEST A. LINKE
BY
ATTORNEY

United States Patent Office 3,346,795
Patented Oct. 10, 1967

3,346,795
SPEED CONTROL SYSTEM FOR POLYPHASE INDUCTION MOTORS
Ernest A. Linke, Maplewood, N.J., assignor to Breeze Corporation, Inc., Union, N.J., a corporation of New Jersey
Filed May 25, 1965, Ser. No. 458,612
6 Claims. (Cl. 318—227)

ABSTRACT OF THE DISCLOSURE

A speed control circuit for polyphase induction motors in which a plurality of variable impedance circuits are connected in series between the terminals of the power source and the field windings, each of which impedance has two semi-conductor controlled means for changing the source impedance from a high value to a low value.

---

This invention relates to a speed control for polyphase induction motors which require speed changes for a variable load. The invention has particular reference to both medium and high powered induction motors which require a wide range of speeds.

The polyphase squirrel cage induction motor is a popular source of power for many reason. It is cheaper than comparable types of polyphase motors and is economical for converting electric into mechanical power. However, for a fixed frequency input, its operating speed cannot be changed readily. The speed can be changed by inserting a resistor or a reactor in each of the supply lines but this reduces the power to such an extent that the motor cannot start with an average load. Furthermore, the resistors or reactors for such an application would be large and costly.

The present invention inserts series impedances into the supply lines of the motor but these impedances are controlled to offer substantially no resistance at one condition and substantially an infinite impedance when the components are cut off. Experience has shown that these series impedances must be changed from an "on" position to an "off" condition rapidly, within a range of frequencies from two to twenty cycles per second. Ordinarily, switching by mechanical contacts would produce excessive sparking, especially since the stator coils of the motor present a reactive load to the power supply. Semiconductor controlled components are employed so that no sparking is possible. An oscillating circuit is employed to control the semiconductor components.

One of the objects of this invention is to provide an improved speed control circuit which avoids one or more of the disadvantages and limitations of prior art arrangements.

Another object of the invention is to reduce the speed of induction motors without substantially lowering their efficiency.

Another object of the invention is to control the speed of induction motors by a rapid and controlled on-off application of alternating current power.

Another object of the invention is to control the speed of induction motors by the use of small semiconductor circuit components which produce no sparking.

Another object of the invention is to control large currents applied to an inductive load without the creation of a spark.

The invention comprises a speed control circuit for polyphase induction motors and includes a plurality of terminals for the application of polyphase alternating current power. The motor includes a plurality of field windings, one for each phase, and a squirrel cage rotatable armature. A plurality of variable impedance circuits are connected in series between the terminals and the field windings. Each impedance includes two semiconductor controlled means for changing the series impedance from a high value to a low value. Control means are connected to the semiconductor components for controlling their impedance values at a predetermined rate.

One feature of the invention includes the use of silicon controlled rectifiers having a control electrode which is energized by a pair of contacts operated by a relay armature. The relay winding is connected to an oscillator circuit which activates the relay at a predetermined rate.

For a better understanding of the present invention, together with other and further objects thereof, references is made to the following description taken in connection with the accompanying drawings.

Figure 1:
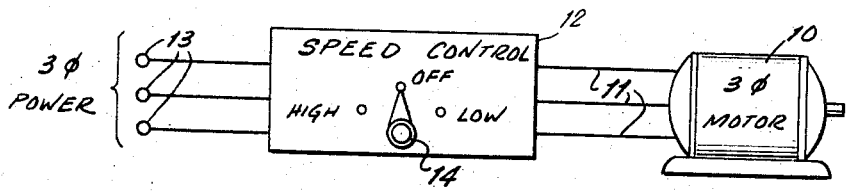
FIGURE 1 is a schematic diagram showing the motor and the speed control circuit in block form.

Referring now to the drawings, FIGURE 1 shows a three phase motor 10 having three input conductors 11, a speed control circuit 12 and three terminals 13 which are to be connected to a source of three phase electrical power.

The speed control circuit 12 in FIGURE 1 includes a manually operated dial switch 14 which may be turned to an "off" position, a "high" position, or a "low" position. When the dial 14 is turned to the "off" position, the three phase power is disconnected from the motor because all the control contacts remain open. When the dial 14 is turned to "high," the three phase power is connected directly to the motor 10 because the control contacts remain closed and the motor runs in the usual manner. When the dial switch is turned to "low," a series of controlled impedances are activated by the opening and closing of contacts and the power is intermittently cut-off, permitting the motor to run at a reduced speed.

Figure 2:
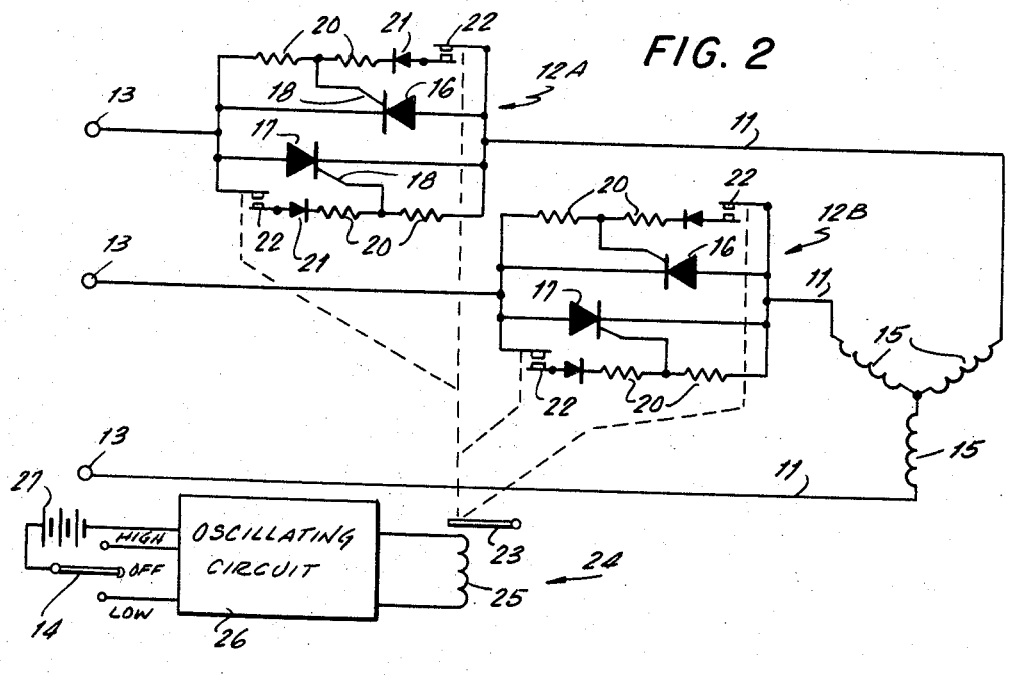
FIGURE 2 is a schematic diagram showing the polyphase terminals, the field windings in the motor, two of the series impedance circuits, the relay, and the oscillating circuit in block form.

FIGURE 2 shows the details of the series circuits, only two of which are required in a three phase system. Impedance circuit 12A includes two silicon controlled rectifiers 16 and 17, each of which is provided with a control electrode 18. Each electrode 18 is connected to a suitable point on a voltage divider 20, which in turn is connected in series with a diode rectifier 21 and a pair of normally open contacts 22. Contacts 22 are mechanically connected to an armature 23 which is part of a relay 24 having a winding 25. Series impedance circuits 12A and 12B are identical, each having the same number of components arranged in the same manner. Circuit 12A is connected to one stator winding 15 which is arranged in a star or "Y" connection. Circuit 12B is connected between one of the terminals 13 and a second stator winding 15. The third terminal 13 is connected directly to the third field winding 15.

Current is applied to the winding 25 of relay 24 by a circuit 26 which produces a series of direct current pulses to attract the armature 23 and close all of the contacts 22 simultaneously. The oscillating circuit is switched on when a manually operated switch 14 is turned to the "low" contact. When the switch is turned to high, the oscillating circuit is by-passed and direct current is supplied to winding 25 at all times. The oscillating circuit 26 requires a direct current power supply for its operation.

Referring now to the circuit shown in FIGURE 2, the series circuits 12A and 12B operate in the following manner. When contacts 22 are open, no current passes between the input terminal 13 and its associated field winding 15 because both silicon controlled rectifiers are in the "off" position and cannot conduct. Current applied to voltage divider circuits 20 and 21 cannot get past the open contacts 22, therefore the controlled rectifiers 16 and 17 cannot be turned on to their conducting condition. This is the "off" position and the motor will not run.

When the contacts are closed by the mechanical motion of armature 23, current from the upper terminal 13 (during a positive cycle of the applied power) flows through the lower contacts 22, diode 21 and the voltage divider 20, then through two windings 15 of the motor, and back to the power source by way of the lowest terminal 13. As soon as this circuit is established, the potential applied to conductor 18 triggers the silicon controlled rectifier 17 and provides a low resistance path between the upper terminal 13 and the two field windings 15. The resistance of circuit 12A during the time rectifier 17 is conducting is less than 6 ohms and a large current pulse is applied to the motor.

During a negative portion of the alternating current wave, current flows in the reverse direction through upper contacts 22, upper diode 21 and the upper voltage divider 20, thereby applying a control voltage over conductor 18 to the silicon controlled rectifier 16 and permitting it to conduct in the opposite direction to provide the field windings with a large current.

Series circuit 12B is the same as circuit 12A and operates in the same manner. It is obvious then that during the time the four contacts are closed, the motor field windings receive operating current and the motor will speed up in the same manner as it would if the motor were connected directly to the line by a switch. The increase in speed depends upon the inertia of the rotating armature and the amount of load, if any, connected to the motor. This increase in speed is shown graphically in FIGURE 3 where curve 30 represents the speed change. If the motor were allowed to continue running, the speed would continue to increase in a manner indicated by dotted line 31 until the top speed, represented by line 32, is reached.

In order to reduce the speed, the oscillating circuit 26 is adjusted so that the pulses applied to winding 25 have a period which is represented by the distance $T_0$ to $T_1$. At the end of this time interval, armature 23 is released and all four contacts 22 are opened, thereby cutting off the electric power to the stator windings. It should be noted that there is practically no sparking at the contacts when they are opened because they carry very little current. When the power is cut off from the motor, the speed decreases in the same manner as it would if power were removed from the motor by opening a switch. This reduction in speed is illustrated in the graph in FIGURE 3 by line 33. If the power is permanently cut off the speed will decrease to zero, this reduction in speed being illustrated by dotted line 34. However, the oscillator is adjusted so that another pulse is applied from circuit 26 to winding 25 at time $T_2$ and at this time armature 23 again closes all contacts 22, thereby applying power as before to the motor and the motor armature is speeded up in accordance with the values illustrated by curve 35.

Figure 3:
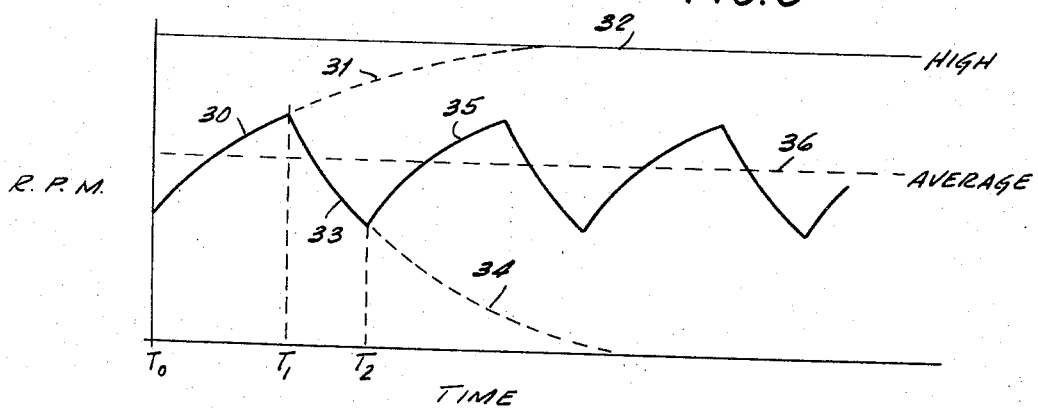
FIGURE 3 is a graph plotted between the revolutions per minute and time and shows the speed of the motor when controlled by the series impedance circuits.

As long as switch 14 is connected to the LOW contacts, the motor will receive interrupted power and will turn at an average speed illustrated in FIGURE 3 by dotted line 36. The circuit may be adjusted so that this average speed is half of the normal speed, three-quarters, or as low as one-quarter. If the time intervals are made too long, the motor will tend to vibrate and if the load is too great it may even come to rest between pulses. If the pulse rate is too high, there may be difficulty in starting. Experiment has shown that for a 400 cycle power supply, a pulse frequency of two to twenty cycles per second is satisfactory.

Figure 5:
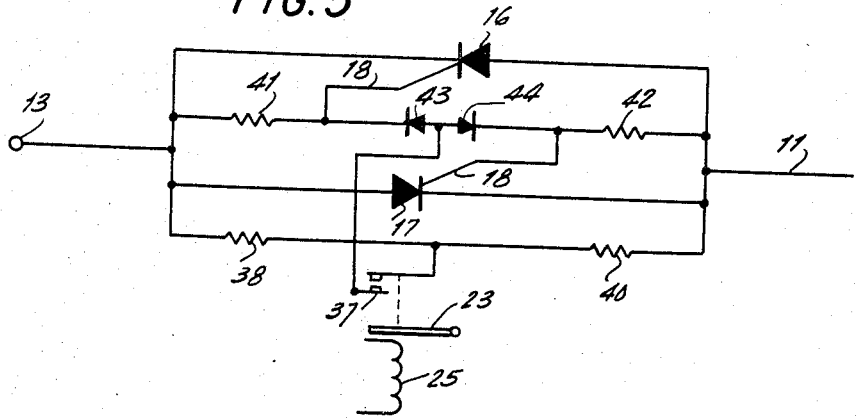
FIGURE 5 is a schematic diagram of a circuit of an alternate form which may be used instead of the circuit shown in FIGURE 2.
Figure 6:
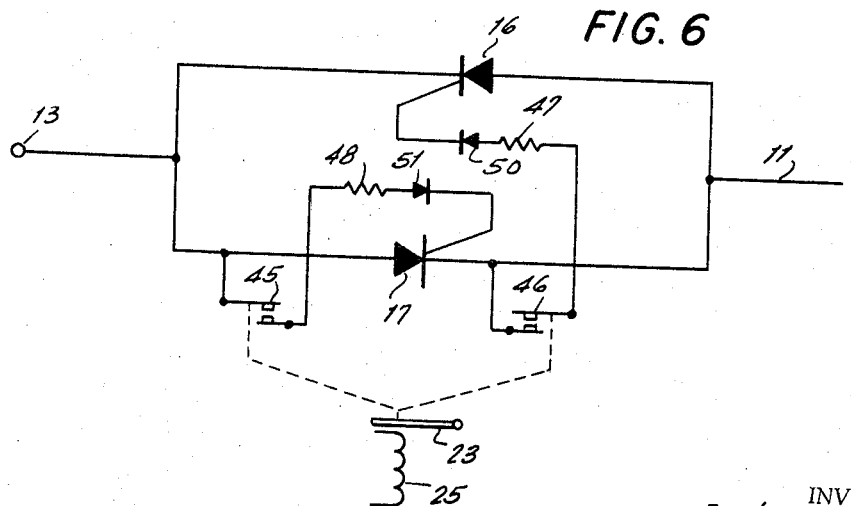
FIGURE 6 is another alternate diagram of connections, similar to FIGURE 5 but showing one of the series impedance circuits controlled by two normally open contacts.

The drawing in FIGURES 2, 5 and 6, show an ordinary type relay with a single armature 23 controlling one or more pairs of contacts. For a pulse speed of 10 cycles per second or more, a reed-type relay is more practical. If such relays are used, all reeds are operated by one coil connected to the output terminals of the oscillating circuit 26. It is to be understood that there are no limitations on the structure of the relay used to operate contacts 22.

The series impedance circuits shown in FIGURE 2 represent only one form of the control circuit for controlling the conductance of the two silicon controlled rectifiers. FIGURE 5 shows an alternate system having a single pair of contacts 37 for each impedance circuit. These contacts are bridged across two voltage dividers, one comprising equal resistors 38 and 40, and the other comprising equal resistors 41 and 42 connected in series with two diode rectifiers 43 and 44. The silicon controlled rectifiers 16 and 17 are shown with their control electrodes respectively connected to the junction points of the resistors and the anodes of the two rectifiers. The action is the same as described above.

A second alternate circuit is shown in FIGURE 6 where two contacts 45 and 46 are required. Each of these contacts is connected between one side of the impedance circuit and a control circuit which includes resistors 47 and 48 and rectifier diodes 50 and 51. When a position wave is applied to terminal 13 and the contacts 45 are closed, a control potential is applied to resistor 48 and rectifier 51. This potential is applied to the control electrode of silicon rectifier 17 causing it to conduct and pass current to the motor. A similar action occurs when a negative portion of the wave is received and rectifier 16 is made conductive.

Figure 4:
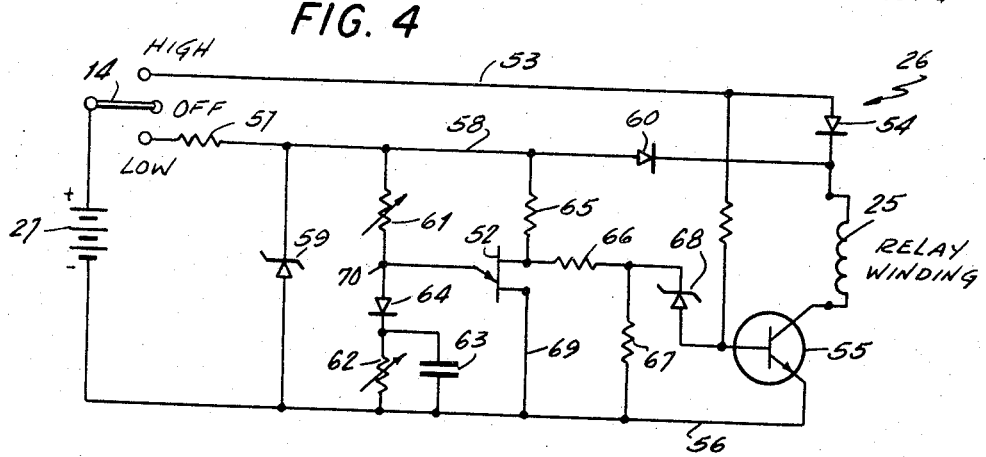
FIGURE 4 is a schematic diagram of the circuit of the oscillator connected to the relay winding.

It is obvious that many types of oscillating circuits may be employed to operate the relay contacts. It has been found by experiment that a square-topped wave applied to the relay winding gives better results than the usual sine wave output. One oscillating circuit, containing no inductance, is shown in FIGURE 4 and includes a unijunction transistor 52. In this circuit when switch arm 14 is connected to the HIGH terminal, the direct current power is carried by conductor 53, through rectifier 54, and relay winding 25, then through the collector-emitter electrodes of a passing transistor 55, and back to the negative conductor 56. This setting provides a continuous current for winding 25 and thereby closes all contacts 22 permitting the motor to run at full power all the time.

When switch arm 14 is turned to "LOW," current is sent through a series resistor 57 to a positive conductor 58. A zener diode 59 is shown in FIGURE 4 to act as a voltage regulator so that the voltage on conductor 58 will remain within a small predetermined range for the operation of the circuit. Current from this conductor passes through a rectifier diode 60 and then through the relay winding 25, and the passing transistor 55 to the negative conductor. The unijunction transistor circuit contains an emitter which is connected to the usual voltage divider circuit including a first resistor 61 and a second resistor 62. Resistor 62 is connected in parallel with a capacitor 63 and in series with a rectifier diode 64. One of the bases of the unijunction transistor is biased by a voltage divider circuit which includes a resistor 65, a second resistor 66, and a third resistor 67. A portion of this voltage divider circuit is connected through a second zener diode 68 to the base of transistor 55. The operation of this circuit is as follows: When the current is first turned on the voltage at the mid-point 70 of the first voltage divider is low because most of the current passes through rectifier 64 to charge capacitor 63. As the capacitor charges up, the voltage of the emitter of transistor 52 is raised until it exceeds the voltage of the base connected to the second voltage divider. When this happens the unijunction transistor "fires" and a large current is sent through the transistor to ground by way of conductor 69. While the transistor is in its conducting condition, capacitor 63 discharges through resistor 62 and then current through transistor 52 is cut off and the sequence of operations is repeated. This type of oscillation is well known and produces output voltage pulses which are applied through the base of transistor 55 causing it to alternately conduct and cut off the current through relay winding 25, thereby producing a series magnetic pulses which open and close contacts 22. There are many other circuits, such as free running multivibrators, which can be arranged to produce the same output pulses.

As shown in FIGURE 4, resistors 61 and 62 are variable and can be adjusted to produce a series of output pulses having a varying frequency and varying periods of on-off conduction.

From the above description and operation it is obvious that a novel type of speed control circuit has been described which is quite flexible and which can be used to turn the power on and off a polyphase induction motor without sparking or creating high voltage transients. It should be noted that, while a star connection of field windings is shown in FIGURE 2, the circuit works equally well with a delta connection.

Having thus fully described the invention, what is claimed as new and desired to be secured by Letters Patent of the United States, is:

1. A speed control circuit for polyphase induction motors comprising: a plurality of terminals for the application of polyphase alternating current power, a plurality of stator windings, one for each phase, in the motor, a plurality of variable impedance circuits connected in series between the terminals and the stator windings, each of said variable impedance circuits having two silicon controlled rectifiers, each having an anode, a cathode, and a control electrode, each impedance circuit also including a voltage divider circuit coupled to said control electrode and connected in series with one of said pair of contacts, two control circuits and at least one pair of contacts connected to the control circuits, a relay including a winding and means for actuating said contacts, said control circuits adapted to change the resistance of the controlled rectifiers when the contacts are actuated, and an oscillating circuit connected to said relay winding for generating a series of pulses which actuate the contacts at a predetermined rate.

2. A speed control circuit as claimed in claim 1, wherein the motor is a three phase motor and there are two variable impedance circuits.

3. A speed control circuit as claimed in claim 1, wherein each of said variable impedance circuits includes two silicon controlled rectifiers, each having an anode, a cathode, and a control electrode, one of said rectifiers connected for passing the positive halves of the alternating current and the other rectifier connected for passing the negative halves of the current and two voltage divider circuits each connected in parallel with said controlled rectifiers, one of said voltage dividers comprising two resistors and two rectifier diodes connected anode to anode, the second of said voltage dividers comprising two resistors, and a pair of normally open contacts connected between the mid-points of said two voltage dividers, and the control electrode of each controlled rectifier being connected to the cathode of the rectifier diode conducting in the same direction as that controlled rectifier.

4. A speed control circuit for three phase induction motors comprising, three terminals for the application of three phase alternating current power, three stator windings in the motor, two variable impedance circuits connected in series respectively between two of said terminals and two of said stator windings, each of said impedance circuits including two silicon controlled rectifiers, one of said rectifiers connected for passing the positive current pulses and the other of said rectifiers connected for passing the negative current pulses, each of said impedance circuits also including a voltage divider circuit for providing a voltage pulse which is applied to a control electrode on the controlled rectifiers for making them conductive, a pair of normally open contacts connected in series with each of the voltage divider circuits for providing the circuits with current when the contacts are closed, and an oscillating circuit including a direct current source of power, a pulse generating means, and a transistor amplifier for amplifying the generated pulses and for applying them to the winding of the relay.

5. A speed control circuit as claimed in claim 4, wherein a unijunction transistor is employed to generate a series of direct current pulses.

6. A speed control circuit as claimed in claim 4, wherein a manually operated switch is connected between the source of direct current power and the oscillator components for activating the circuit, turning off the power, and for connecting a bypass circuit around the oscillator to activate the relay winding continuously and cause the motor to run at high speed.

References Cited

UNITED STATES PATENTS

| | | | |
|---|---|---|---|
| 2,703,860 | 3/1955 | Large et al. | 318—227 |
| 2,722,649 | 11/1955 | Immel et al. | 318—227 X |
| 2,876,406 | 3/1959 | Charbonneaux et al. | 318—227 |
| 2,995,690 | 8/1961 | Lemon | 318—171 X |
| 3,089,992 | 5/1963 | Seney | 318—231 X |
| 3,150,307 | 9/1964 | Kaeding | 318—345 |
| 3,253,202 | 5/1966 | Cotton | 318—227 |

ORIS L. RADER, *Primary Examiner.*

G. Z. RUBINSON, *Assistant Examiner.*